United States Patent Office 3,382,614
Patented May 14, 1968

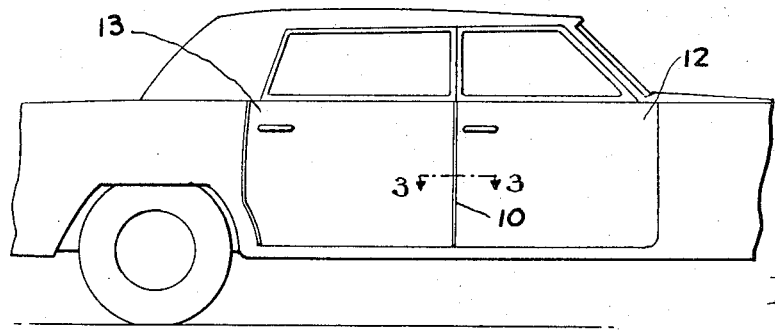
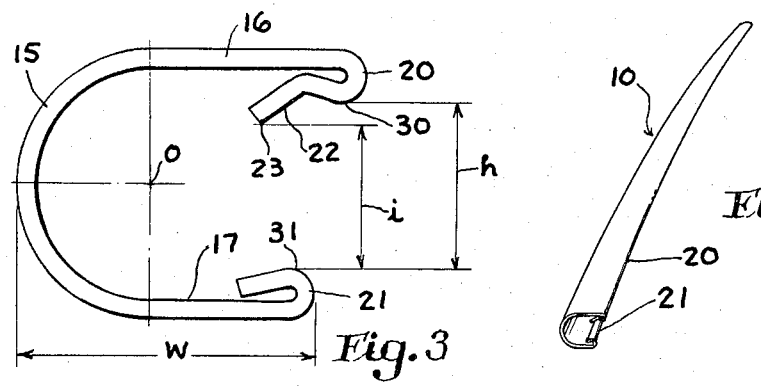
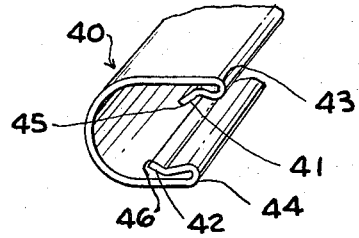
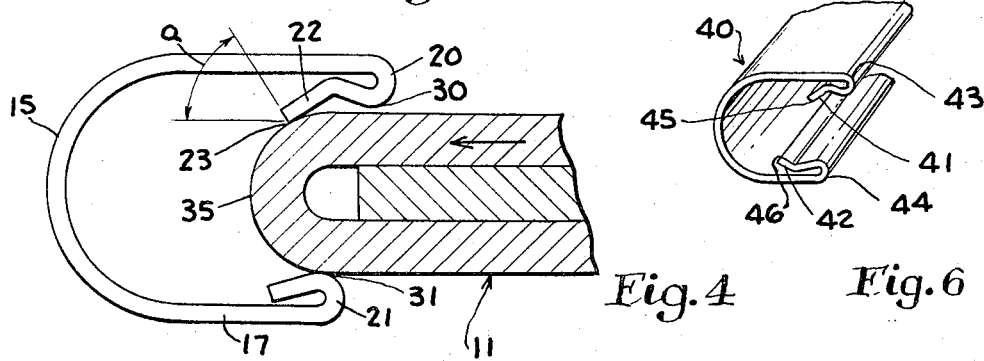
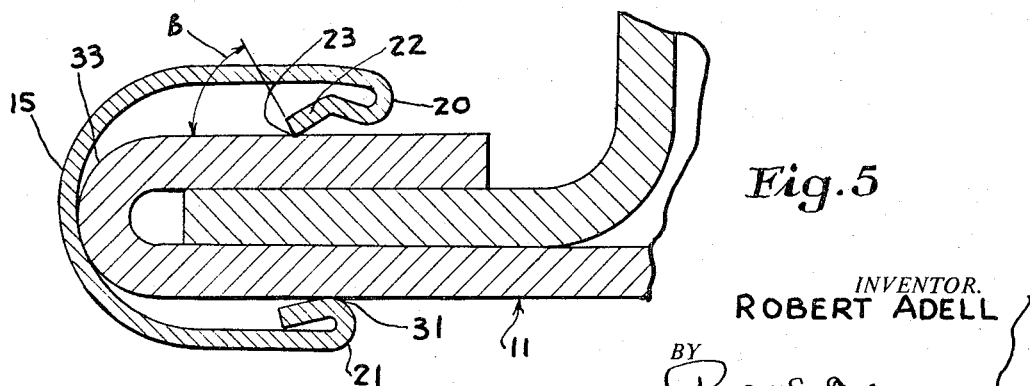

3,382,614
ORNAMENTAL AND PROTECTIVE MOLDING
FOR MOTOR VEHICLE DOORS
Robert Adell, 1365 Balmoral, Detroit, Mich. 48203
Filed Oct. 15, 1965, Ser. No. 496,606
2 Claims. (Cl. 49—462)

ABSTRACT OF THE DISCLOSURE

An ornamental and protective molding for the edge of an automobile door, the molding being made of a resilient sheet metal and having a substantially U-shape cross section to go over the edge of the door and to embrace the same, the leg of the U-shape cross section intended to be on the outside of the door edge being shorter than the other leg, with the edges of the molding appearing as the ends of its U-shape cross section being bent inwardly of the U to form rounded edges, the size of the U-shape cross section being so selected that the distance between the rounded edges inside of the U is larger than the thickness of the door edge received therebetween, an inwardly protruding extension provided on the edge of the longer leg of the U pointing substantially toward the center of the curvature of the bottom of the U, the distance between the end of the extension and the rounded edge of the other leg being smaller than the width of the edge of the door received therebetween to ensure in the installed position of the molding exertion of resilient pressure by the end edge of the extension on the innerside of the door edge for retaining the molding in place.

SUMMARY OF THE INVENTION

This invention relates generally to ornamental moldings for use on automotive vehicles and the like and, more particularly, to a new and improved protective molding adapted to be mounted on the edge of an automotive vehicle door or the like.

The important functional and styling advantages of such moldings in motor vehicles, such as passenger automobiles, have now been well appreciated in the art. A number of constructions of such moldings are now on the market, being incorporated into original equipment, i.e., applied to the trailing edges of the doors of new automobiles at the factory, as well as sold as accessories for application to automobiles already on the road.

With such ornamental and protective moldings becoming a more and more accustomed item in automobile industry, increased requirements are presented to them both with respect to their ornamental purport as well as functional performance. With respect to ornamental purport of such moldings, the increased requirements relate in part to having the width of such molding on the outerside of the door edge as narrow as possible. This requirement is based on the present styling trend of avoiding any vertically-extending styling elements, particularly of the ornamental character such as moldings, in order to give prevalence to horizontally extending elements, i.e., elements extending in the direction of the vehicle movement and thus imparting to it a more dynamic appearance. It is considered that ornamental elements extending transversely to the direction of the vehicle movement are interfering and partially destroying such dynamic appearance of the vehicle. Accordingly, while in the immediate past the width of the molding on the outer side of the door edge of ¼ inch was considered to be not only accepetable but also to be the smallest practicable width, the pressure of the industry toward producing a still narrower width has been apparent for quite a number of years.

Heretofore, it was considered that the molding of this general nature cannot be made less than ¼ inch in width in its outer leg, i.e., its portion extending on the outer side of the vehicle door, and have sufficiently strong grip action on the door edge to remain in place in operation of the vehicle. It should be appreciated that such molding is applied to a smooth painted edge of the door, and is subject in operation to road vibrations and severe shocks caused by closing the door. Under such conditions the molding may slip off either fully or partially at its ends. In the latter case such molding presents danger of catching on clothing or anything brushing against it, whereupon the molding may be pulled off completely from the door edge.

One of the objects of the present invention is to provide an improved ornamental and protective molding for the trailing edges of motor vehicle doors, particularly of doors of passenger automobiles, whereby the above difficulties and disadvantages are overcome and largely eliminated without introducing other problems or appreciably increasing the costs involved.

Another object of the persent invention is to provide an improved ornamental and protective molding of the above nature which is much narrower in its outer leg than was heretofore considered practical, and yet which possesses greatly increased gripping action on the door edge ensuring the molding remaining in place under severe conditions of use.

A further object of the present invention is to provide an improved ornamental and protective molding of the foregoing character, including elements serving as guiding means in application of the molding to a door edge and as anchoring means when the molding tends to move in the direction of slipping off from the door edge.

Further objects and advantages of this invention will be apparent from the following description and appended claims, reference being had to the accompanying drawings forming a part of this specification, wherein like reference characters designate corresponding parts in the several views.

FIG. 1 is a fragmentary elevational view of a motor vehicle showing ornamental and protective molding, such as one embodying the present invention, applied at the trailing edge of the doors thereof.

FIG. 2 is a perspective view of the molding shown separately.

FIG. 3 is a transverse sectional view of the molding of FIG. 2 on an enlarged scale and in its free condition, i.e., prior to its application to the door edge.

FIG. 4 is a view similar in part to FIG. 3 showing application of the molding to the door edge at the start of the application operation.

FIG. 5 is a view similar in part to FIG. 4 but showing the molding fully applied to the door edge.

FIG. 6 is a view similar in part to FIG. 3, showing a modified construction.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Referring specifically to the drawing, and particularly to FIGS. 1–5 thereof, the ornamental and protective molding illustrated therein and generally designated by the numeral 10 is shaped to be applied to the lower portion of the trailing edge 11 of automobile doors 12 and 13. It will be understood that shaping of the molding includes not only providing therein a desired cross section illustrated and described herein in detail but also imparting to it longitudinal configuration corresponding to that of the edge to which it is to be applied.

From an examination of FIG. 1 it will be understood that longitudinal configuration of the molding for the doors 12 and 13 must be different as resulting from the longitudinal configurations of the trailing edges of the respective doors. Since the present invention has a particular reference to cross-sectional construction of the molding, the present invention is illustrated and described with reference to the molding 10 applied to the door 12, it being understood that the same considerations are fully applicable to the molding for the door 13.

The molding is preferably made of resilient sheet metal such as spring steel, but other resilient materials may also be used.

As is best shown in FIG. 3, the molding 10 is of a generally U-shape cross section, having one of its ends rounded as shown at 15, with the center of the curvature thereof appearing in FIG. 3 as the point O. The end edges of said portion 15 continue outwardly in tangential directions to form legs 16 and 17. The leg 17 is the outer leg, i.e., it is the end view of the portion of the molding intended to be disposed on the outer side of the door edge 11 as shown in FIGS. 4 and 5. It is an important feature of the present invention that the leg 17 is considerably shorter than the leg 16 in order to decrease to a practicable minimum the outer exposure of the molding, i.e., to make the same as narrow as possible without endangering its gripping action. On the other hand, the leg 16 is made as long as desired for the purposes of safe gripping action, and its length representing the width of the inner portion of the molding is not governed by appearance considerations.

I prefer to make the length of the leg 17 together with the radius of the rounded portion 15, indicated in FIG. 3 by the line w to be less than ¼ of an inch. I have found that with the construction illustrated and described herein, the dimension w of 3/16 of an inch produces a striking change in the appearance of the molding on the motor vehicle. Such a molding appears merely as a bright streak or line rather than a shiny molding of any appreciable width. On the other hand, the leg 16 may be made longer to make the other portion of the molding 7/32 of an inch or even ¼ inch in width.

On the ends of the legs 16 and 17 (with the reference to cross-sectional view of the molding) there are provided curls 20 and 21 extending inwardly of the U and thus providing well-rounded ends on said legs or well-rounded longitudinal edges on the molding, see FIG. 2. On the inner end of the curl 20 there is provided an extension 22 extending toward the center O of the portion 15 and having a sharp edge 23.

The trailing edge of the door usually includes three thicknesses of metal, as shown in FIGS. 4 and 5. With the single thickness of the metal being approximately 1/16 inch, the total thickness of the door edge is thus approximately 3/16 inch or somewhat less. The dimensions of the molding are so selected that the projected distance between points 30 and 31, i.e., the width of the mouth of the cross section of the molding designated in FIG. 3 by h, is slightly larger than the thickness of the door edge 11. On the other hand, the dimension indicated in FIG. 3 by the letter i, which is the projected distance between point 31 and the edge 23, is somewhat less than the thickness of the door edge 11.

By virtue of such a construction, in application of the molding to the door edge, the door edge enters the mouth of the U freely and contacts with its rounded portion 33 the extension 22. In further movement of the door edge into the U, the extension 22 of the molding serves as a guiding ramp for the door edge 11, as is best shown in FIG. 4. As the door edge is moved further into the molding, or the molding moves further on the door edge and contacts with the inner surface of its portion 15 the rounded end 33 of the door edge, the resilient molding is spread, and the points 31 and 23 exert resilient pressure on the respective surfaces on the door edge 11 which they contact. The point 31 representing a rounded edge of the molding sliding over the painted outer surface of the door does not cause any damage to such painted surface, which is an important advantage. On the other hand, the point 23 represents a sharp edge. However, since such edge contacts the surface of the door at a very flat angle, it does not damage the surface of the door and cannot dig into the door edge surface to any appreciable degree. In addition, the door surface in question is not exposed to view, and the scratches on such surface, should any occur, are concealed by the molding.

The molding in its applied condition is shown in FIG. 5. From an examination of said FIG. 5 it can be understood that tendency of the molding to come off the door edge 11 would cause the sharp edge 23 to dig into the door surface, since the angle $b$ is relatively steep and is substantially greater than the angle $a$ in the free condition of the molding.

Utilizing the terminology of the cutting tools art, the above condition may be expressed by stating that in application of the molding to the door edge, the rake angle at the sharp edge 23 is a large negative rake angle. On the other hand, in movements of the molding off the door edge, i.e., in the reverse direction, the negative rake angle at the sharp edge 23 is much smaller and therefore the ability of the edge 23 to dig into the surface of the door edge is greatly increased.

It should also be appreciated that the pressure at the edge 23 and the resulting deformation of the molding cross section also cause the curl 20 to move closer to the door edge, which condition can be appreciated by comparison of FIGS. 4 and 5. This condition causes the molding "to sit" better on the door edge, and the rake angle at the edge 23 to increase still further.

FIG. 6 illustrates a modified construction in which a molding 40, generally similar to the molding 10, has extensions 41 and 42 on both of its curls 43 and 44 in order to provide for digging in of the sharp edges 45 and 46 into the respective surfaces of the door edge. Such a construction has particular advantages under the conditions where possibility of scratching the outer surface of the door edge is not of importance, but increased gripping and holding ability of the molding of the door edge is desired.

By virtue of the above disclosed construction, the objects of the invention listed above and numerous listed advantages are attained.

I claim:

1. An ornamental and protective molding for the edge of an automobile door, said molding being made of a resilient sheet metal and having a substantially U-shape cross section to go over the edge of the door and to embrace the same, the molding thereby defining a pair of spaced, substantially parallel legs and an arcuate-shaped intermediate section, the leg of the U-shape cross section intended to be on the outside of said door edge being shorter than the other leg, with the edges of said molding appearing as the ends of its U-shape cross section being bent inwardly of the U to form rounded edges, the size of said U-shape cross section being so selected that the distance between said rounded edges inside of the U is larger than the thickness of the door edge received therebetween, and inwardly protruding extenion provided on the edge of the longer leg of the U pointing substantially toward the center of the curvature of the arcuate section of the molding, the distance between the end of said extension and the rounded edge of the other leg being smaller than the width of the edge of the door received therebetween to ensure in the installed position of the molding exertion of resilient pressure by the end edge of said extension on the innerside of the door edge for retaining the molding in place.

2. The construction defined in claim 1, with said extension also having a sharp edge, whereby said extension acts as a guiding ramp in receiving the door edge between said legs and serves to ensure resilient pressure on the innerside of the door edge pressing thereon with said sharp edge, said sharp edge being disposed relative to said rounded end of the longer leg of the U to be biased toward the door edge and at the same time change the rake angle of said sharp edge to increase its ability to cut into the door edge.

References Cited

UNITED STATES PATENTS

| | | | |
|---|---|---|---|
| 1,523,285 | 1/1925 | Pritchett | 49—462 X |
| 2,902,313 | 9/1959 | Adell | 49—462 |
| 2,902,314 | 9/1959 | Adell | 49—462 |

FOREIGN PATENTS 191,604  10/1956  Austria.

DAVID J. WILLIAMOWSKY, *Primary Examiner.*

EARL J. WITMER, *Examiner.*

P. C. KANNAN, *Assistant Examiner.*